S. POOLEY.
CONFECTIONERY MACHINERY.
APPLICATION FILED JAN. 11, 1909.
966,357.
Patented Aug. 2, 1910.
6 SHEETS—SHEET 1.
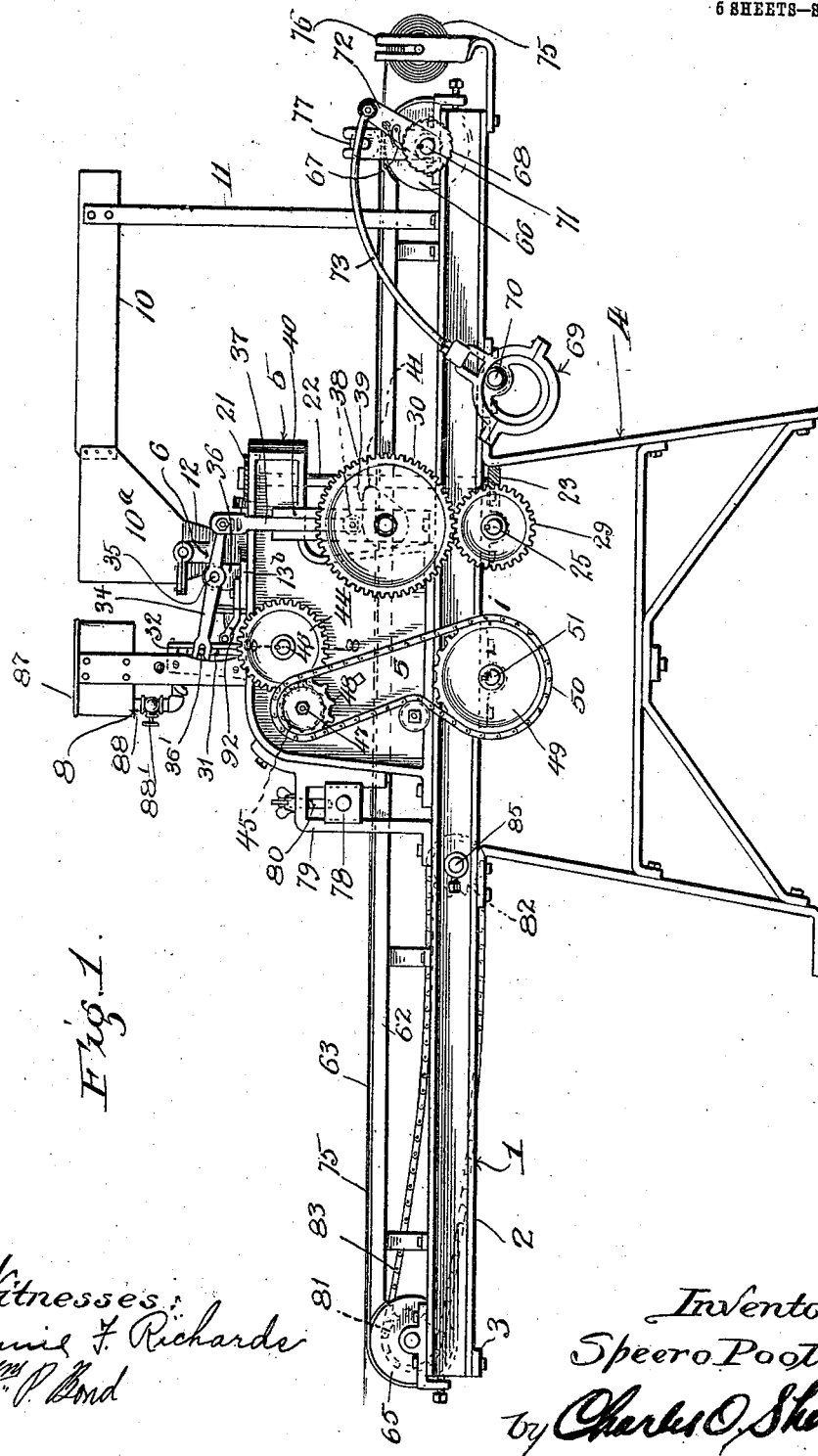
Witnesses:
Fannie F. Richards
Wm. P. Bond
Inventor:
Speero Pooley,
by Charles O. Shurvey
his Atty

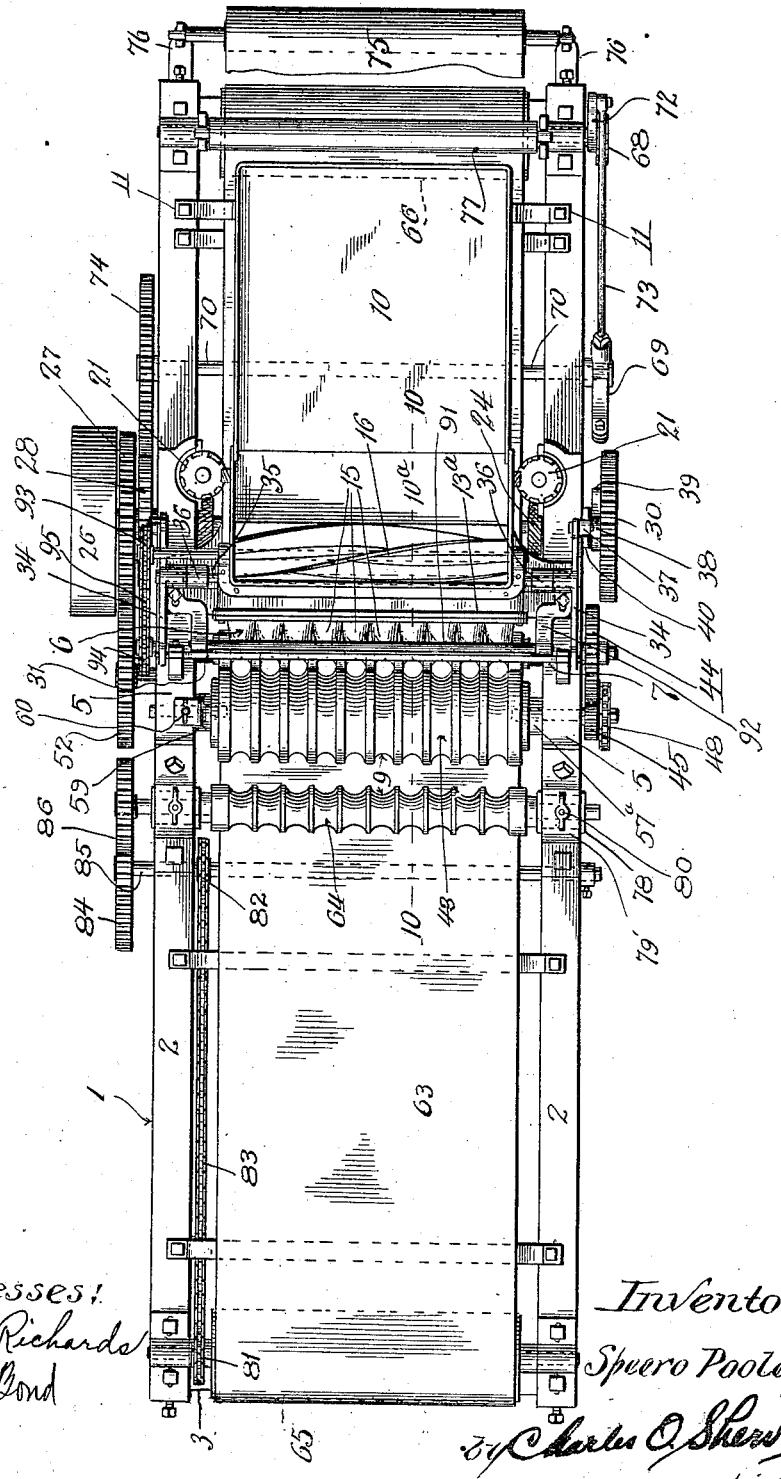

S. POOLEY.
CONFECTIONERY MACHINERY.
APPLICATION FILED JAN. 11, 1909.
966,357.
Patented Aug. 2, 1910.
5 SHEETS—SHEET 3.
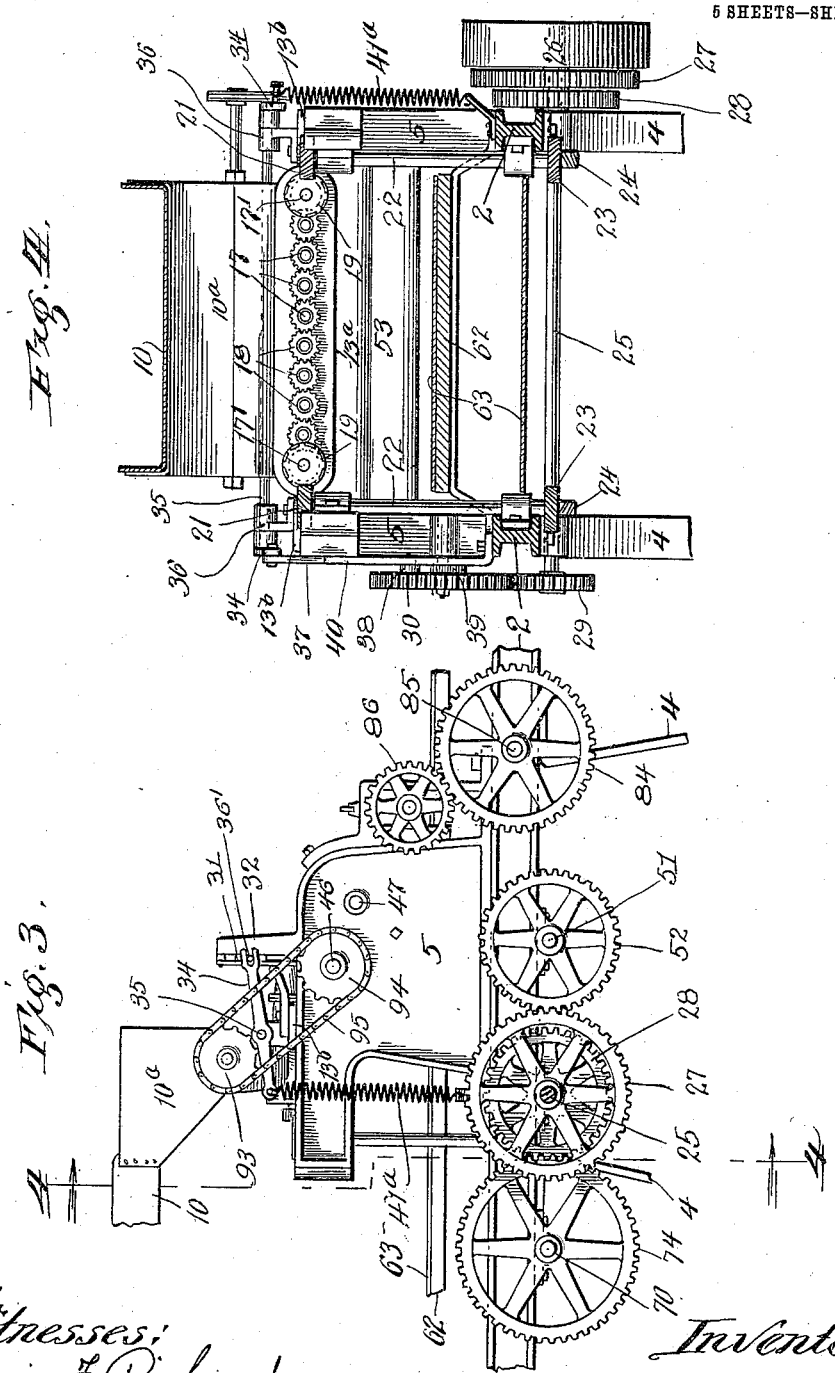

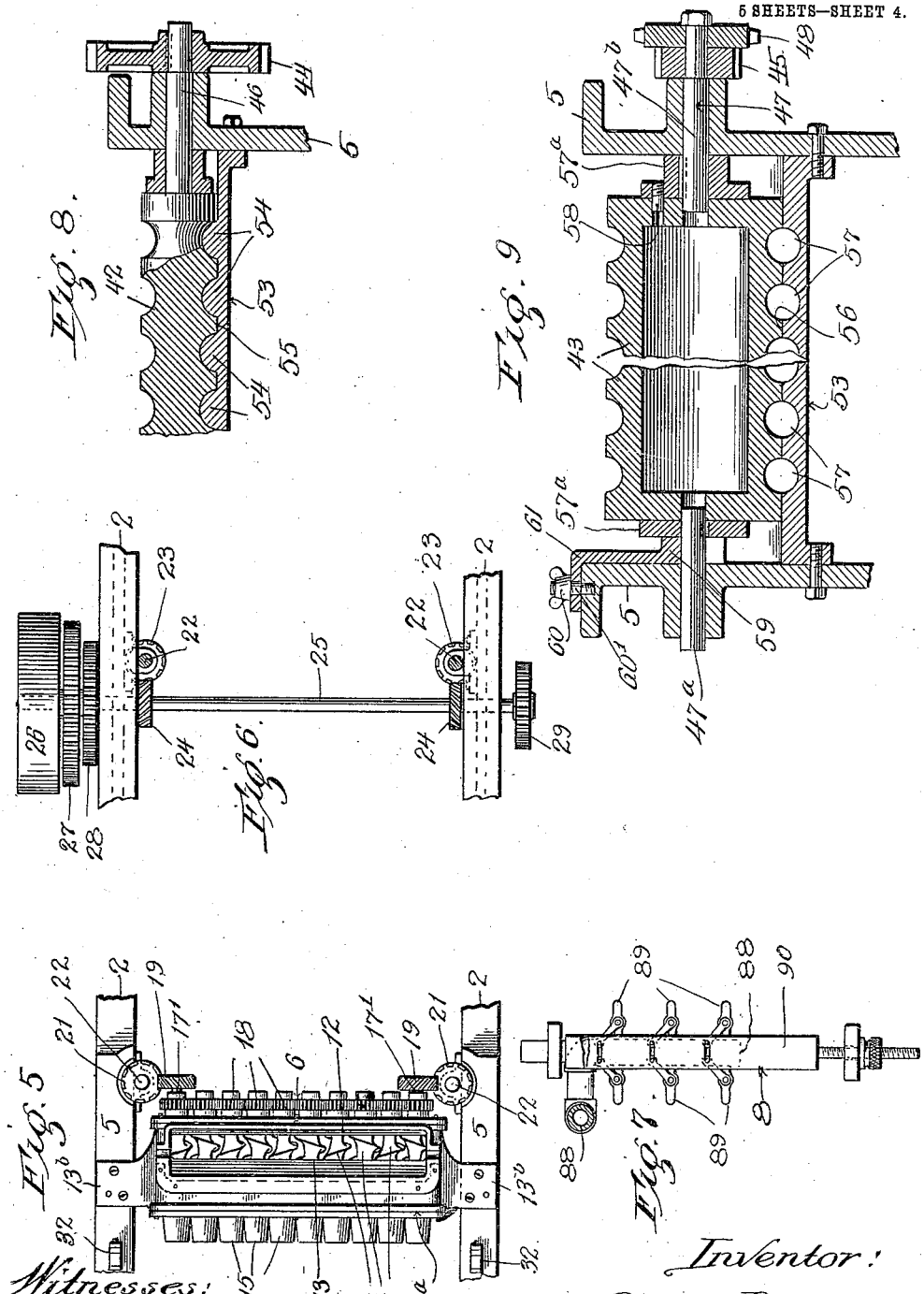

S. POOLEY.
CONFECTIONERY MACHINERY.
APPLICATION FILED JAN. 11, 1909.
966,357.
Patented Aug. 2, 1910.
5 SHEETS—SHEET 5.
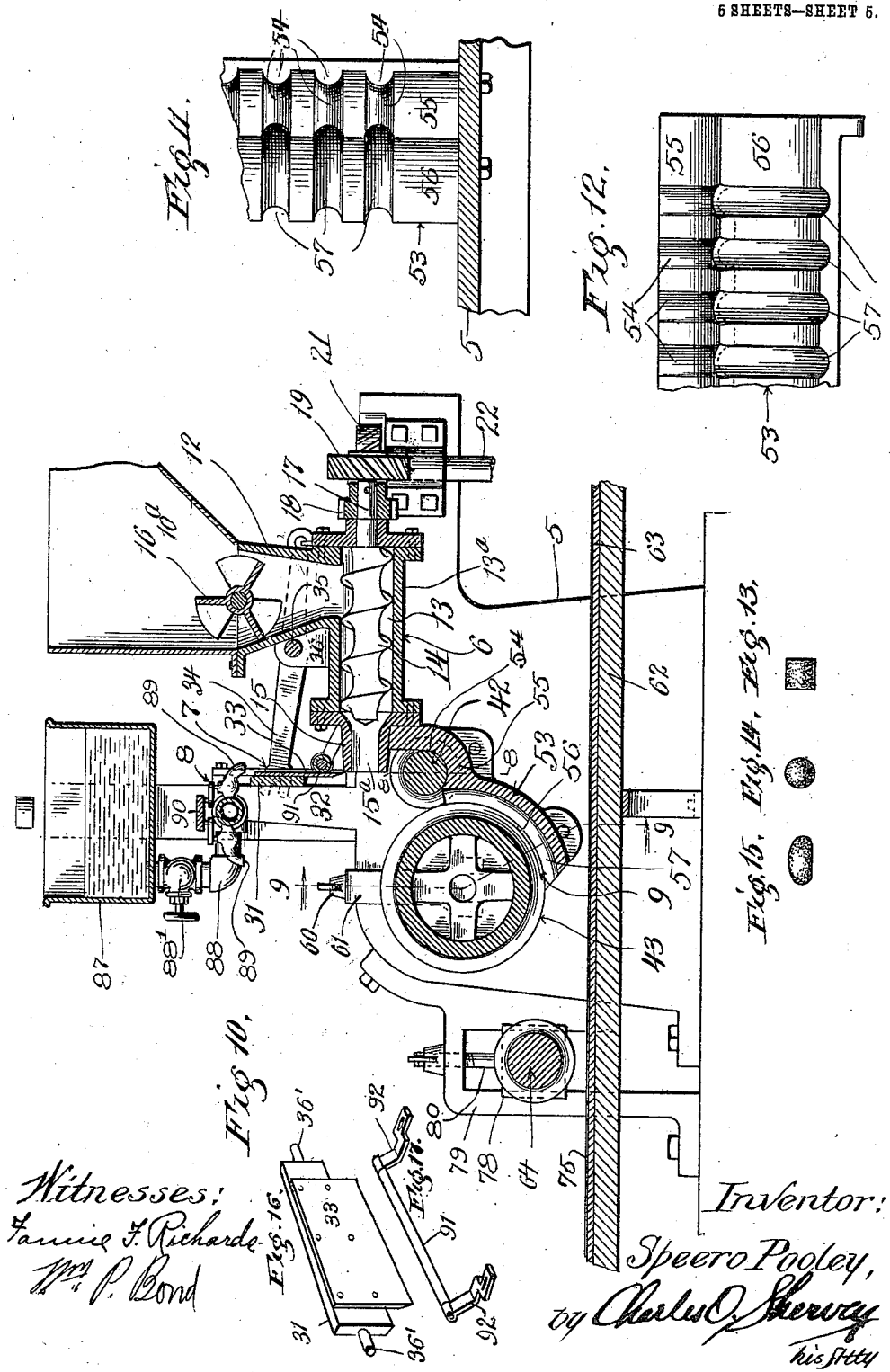
Witnesses:
Fannie F. Richards
Wm. P. Bond
Inventor:
Speero Pooley,
by Charles O. Sherway
his Atty

UNITED STATES PATENT OFFICE.

SPEERO POOLEY, OF CHICAGO, ILLINOIS.

CONFECTIONERY MACHINERY.

966,357.   Specification of Letters Patent.   Patented Aug. 2, 1910.

Application filed January 11, 1909. Serial No. 471,619.

*To all whom it may concern:*

Be it known that I, SPEERO POOLEY, a citizen of the United States, residing at Chicago, in the county of Cook and State of Illinois, have invented certain new and useful Improvements in Confectionery Machinery, of which the following is a specification.

This invention relates to improvements in confectionery machinery.

The object of the invention is to provide an improved machine for molding candy or bakery stock into certain shapes.

In the form shown in the drawings, the machine has been designed for molding the stock into bodies of substantially hemispherical form, but it is evident that by employing cylinders of the proper contour, other fancy shapes may be given to the confections.

The invention further relates to the several novel features of construction, combination and arrangement of parts, a description of which will be found in the following specification and the essential features of which will be defined in the claims appended hereto.

The invention is clearly illustrated in the drawings furnished herewith, in which—

Figure 1 is a front view of a machine embodying my improvements, Fig. 2 is a plan view thereof with a certain lubricating device removed, Fig. 3 is a rear view of a fragment of the machine illustrating part of the gearing, Fig. 4 is a vertical cross section taken on the line 4—4 of Fig. 3, Fig. 5 is a plan view of the stock feeding mechanism, Fig. 6 is a plan view of part of the gearing between the main driving shaft and said stock feeding mechanism, Fig. 7 is a plan view of the distributers of a lubricating mechanism, Fig. 8 is a detail vertical cross section taken on the line 8—8 of Figs. 1 and 10, Fig. 9 is a detail cross section taken on the line 9—9 of Fig. 10, Fig. 10 is a detail, vertical, longitudinal section taken through the feeding mechanism, lubricating mechanism and shaping mechanism, the line of section being indicated at 10—10 in Fig. 2, Fig. 11 is a plan view of the fragment of a shaping plate, showing a fragment of the frame of the machine in horizontal section, Fig. 12 is a front view of said plate, Figs. 13, 14, 15 are side views of a block of candy stock, showing the same in three different stages of formation, Fig. 16 is a perspective view of the knife and Fig. 17 is a perspective view of a guide for the knife.

In these views, 1, represents the main frame which is here shown as comprising two longitudinal side bars 2, cross bars 3, connecting said side bars, legs 4, and standards 5. The standards 5, are supported upon the longitudinal side bars 2, and support the candy feeding mechanism 6, the cutting mechanism 7, the lubricating mechanism 8, and the candy shaping mechanism 9.

The candy stock is received upon a pan 10, which is supported at one end by posts 11. It is fed by hand from this pan into the feeding mechanism. The feeding mechanism comprises in general a chute 10ᵃ, a hopper 12, and a feeding chamber 13, in which are journaled a plurality of spiral conveyers or worms 14. The chamber 13, is provided within a casing 13ᵃ, which is supported upon the standards by ears 13ᵇ. The worms are arranged side by side in the feeding chamber 13, and the front end of the feeding chamber is provided with a plurality of spouts 15, containing discharge orifices 15ᵃ, which are preferably arranged in alinement with the worms 14. The material is forced out through these orifices in the form of bars which are cut off by the cutting mechanism into small blocks. In the preferred form, these orifices are round, so that the stock comes out in the shape of a round bar.

If desired, a rotatable paddle 16, may be provided in the chute 10ᵃ, to assist in supplying the feeding chamber 13, with the candy stock. The paddle may be geared to the driving mechanism as will appear hereafter. This paddle may be dispensed with if it is so desired.

The worms 14, have spindles 17, which project out of the rear end of the casing, and said spindles carry pinions 18, which intermesh with each other as clearly indicated in Fig. 4. The end spindles 17', carry spiral gears 19, which mesh with spiral gears 21, secured upon the upper ends of vertically extending shafts 22. Said shafts 22, are journaled in bearings supported upon the side bars 2, and carry spiral gears 23, upon their lower ends which mesh with spiral gears 24, that are carried by the main drive shaft 25, of the machine. This arrangement provides a very simple form of gearing between the driving shaft and the feed worms.

The main drive shaft extends across the machine and is journaled in bearings secured upon the longitudinal side bars 2. It carries upon one end a drive pulley 26, and two gears 27, 28, and upon its other end a gear 29. The gear 29, meshes with a gear 30, journaled upon a stud extending out from the frame and said gear 30, operates the cutting mechanism which will now be described.

A knife carrying bar 31, (see Figs. 10 and 16) is guided to move vertically in standards, 32, secured to the frame of the machine, and to the bar 31, is secured a knife 33, which has a cutting edge upon its lower edge. The knife extends immediately in front of all of the spouts of the feeding chamber and is arranged to be reciprocated vertically and at predetermined intervals so as to cut off blocks of the proper size. The bar 31, is carried by two arms 34, which are mounted upon a cross shaft 35, journaled in brackets 36, secured upon the flanges or ears 13$^b$. One end of each of said arms 34, is preferably forked to embrace studs 36', which extend out from the bar 31, and the other end of one of said arms 34, is secured to a connecting rod 37, which rod carries upon its lower end a roller 38, that rides upon a cam 39. The connecting rod 37, is guided in a post 40, and is raised by the point 41, of the cam 39, once during each revolution of the same. A spring 41$^a$, acts to raise the knife to its upper position. Said cam is connected to the gear wheel 30, so as to revolve therewith and the arrangement of the gearing between the main drive shaft and gear 30, and between the main drive shaft and feed worms 14, is such that the worms will feed out the proper amount of stock to form a block of the right length during each rotation of the gear 30, and the knife will then cut off said block of stock.

Immediately below the discharge orifices 15$^a$, is journaled a feeding roller 42, which is arranged to feed the stock, as it falls from the spouts, to the shaping or molding devices. The roller 42, in its preferred form contains a plurality of circumferentially arranged grooves in its surface, which grooves are arranged in alinement with the discharge orifices and through which the severed blocks of stock fall. A shaping cylinder 43, is journaled in front of the feeding roller 42, and in its preferred form also contains a plurality of circumferentially arranged grooves in its surface, which grooves are in alinement with the grooves in the feeding roller 42, and with the discharge orifices 15$^a$. The roller 42, and cylinder 43, are geared together by gears 44, 45, which are mounted upon shafts 46, 47, that extend out from the roller 42 and cylinder 43, respectively. The shaft 47, has a sprocket wheel 48, secured upon its outer end which is connected with a sprocket wheel 49, by a sprocket chain 50. The sprocket wheel 49, is mounted upon one end of a shaft 51, which extends across the machine and is journaled in bearings secured to the side bars 2, and said shaft 51, and carries upon its opposite end a gear wheel 52, which meshes with the gear wheel 27, on the main driving shaft 25. The gearing is such that the shaping cylinder 43, is driven quite rapidly, whereas the feeding roller 42, is driven at a somewhat slower rate of speed. A shaping plate 53, is arranged adjacent to the roller 42, and cylinder 43, and contains a number of beads 54, which enter the grooves of the roller 42. The plate 53, has two arc shaped faces 55, 56, the planes of which are struck from the axes of the roller 42, and cylinder 43, respectively, as centers. The contour of the face 55, corresponds with that of the roller 42, and fits against said roller so as to provide a closure whereby the candy stock cannot escape or be carried around by said roller. The face 56, contains circumferentially arranged grooves 57, which are arranged in alinement with the beads 54, and said grooves lie opposite the grooves in the cylinder 43, thus forming channels or passages through which the stock is rolled by the cylinder 43, the effect being that the stock is rolled between the grooved faces of the plate and cylinder until the stock bodies take the form of spheres. The configuration of the surfaces of the plate and cylinder may of course be changed to vary the form of the bodies of stock.

The cylinder 43, is made readily removable from its shaft and as shown this is accomplished by making the shaft in two parts 47$^a$, 47$^b$, which are journaled in the standards 5. Each stub shaft projects into the cylinder and has a collar 57$^a$, secured to it, which collar bears against the end of the cylinder. The collar on the stud shaft 47$^b$, has a pin 58, which enters an opening in the end wall of the cylinder and couples the cylinder with the shaft.

The shaft 47$^a$, is movable endwise of the cylinder but is held in place by a block 59, which is interposed between the collar 57$^a$, and the standard 5. The block is held in place by any desired means, here shown as a wing nut 60, threaded upon a pin 60', and bearing upon an arm 61, of the block. By unscrewing the wing nut, the block 59, may be removed, the shaft 47$^a$, moved back, and the cylinder 43 withdrawn.

Below the shaping cylinder is supported a platform 62, over which travels an endless conveyer belt 63, that is arranged to carry the rolled bodies under a flattening cylinder 64, and subsequently carry them toward the end of the platform for removal. The belt 63, is carried by two rollers 65, 66, journaled in bearings mounted on the side bars and the roller 66, is intermittently advanced by a pawl and ratchet mechanism 67, 68, which is operated by an eccentric 69, mounted on a shaft 70. The ratchet 68, is fast upon the shaft 71, which carries the roller 66, and the pawl 67, is carried by an arm 72, which is loosely mounted upon the shaft 71. The arm 72, is connected to the eccentric by a rod 73. It is evident that each revolution of the shaft 70, advances the belt one step. The shaft 70, extends across the machine and carries a gear 74, which meshes with the gear 28, on the main drive shaft 25.

A paper covering 75, is provided for the belt, and the confections fall upon said covering. The covering is drawn from a roll of paper carried by a roller journaled in brackets 76. The covering passes between the roller 66, and a weighted roller 77, which arrangement facilitates the moving of the covering along with the belt. The flattening cylinder contains circumferentially arranged grooves in its surface which are somewhat wider than the grooves in the shaping cylinder, and said flattening cylinder is adjusted so as to roll upon the spherical bodies, as they pass under the same, and flatten or broaden them out slightly. The flattening cylinder is journaled in bearings 78, which are slidably mounted in brackets 79, and supported by adjusting screws 80.

The cylinder 64, is geared to move in unison with the belt 63, and as shown said gearing comprises sprockets 81, 82, connected by a sprocket chain 83, a gear wheel 84, upon the shaft 85, of the sprocket 82, and a gear 86, upon the shaft of the cylinder 64. By means of this arrangement the cylinder is moved in unison with the belt 63, so that it rolls out the spherical bodies as they pass underneath.

I have provided a lubricating device for lubricating the knife, and shaping cylinder, inasmuch as the material which is used is quite sticky and might otherwise adhere to the parts. As shown, a supply tank 87, is supported over the machine, and a distributing pipe 88, leads from the tank, which pipe is controlled by a valve 88¹. The pipe 88, has faucets 89, extending out from it which discharge the lubricant upon the knife and shaping cylinder 43. The flow of the lubricant is controlled by a rod 90, which is connected with the handles of all of the faucets, so that by moving the rod the supply can be regulated at will. Water is usually employed as a lubricant although of course other suitable lubricant may be substituted therefor.

A guide roller 91, has been provided for the knife, and said roller is carried by arms 92, which are adjustably mounted upon the ears 13ᵇ. This roller bears upon the knife and aids in guiding the same in its vertical movement.

When the beater 16, is employed it is geared to some other rotating element of the machine, and as shown a simple form of gearing comprises a sprocket 93, upon the shaft of the beater, a sprocket 94, upon the shaft of the roller 42, and a sprocket chain 95, connects the sprocket wheels.

In operation the feed worms force the stock out through the discharge orifices, the knife cuts off the sections which protrude beyond the spouts, and they fall upon the feeding roller 42, which brings them down to the channels formed by the grooves in the faces of the cylinder 43, and plate 53. The cylinder 43, rolls the bodies against the plate and forms them into spheres. They fall upon the paper covering over the conveyer belt and are intermittently advanced by the eccentric and pawl and ratchet mechanism, passing under the flattening cylinder and eventually being removed by an attendant.

I am aware that various alterations and modifications of the details of construction are possible without departing from the spirit of my invention, and I do not therefore desire to limit myself to the exact construction shown and described.

I claim as new and desire to secure by Letters Patent:

1. In confectionery machinery, the combination with a stationary, grooved, arc shaped shaping plate, of a rotary, grooved cylinder coöperating therewith to roll stock into spherical shape, a conveyer belt and a rotary, grooved cylinder operating to flatten the spherical stock material.

2. In confectionery machinery, the combination with a stationary, grooved, arc shaped, shaping plate, of a rotary, grooved cylinder coöperating therewith to roll the stock into spherical shape, an intermittently moving conveyer belt and an intermittently moving cylinder having grooves for flattening out the spherical stock bodies.

3. In confectionery machinery, the combination with a stationary, grooved, arc shaped, shaping plate, of a rotary, grooved cylinder coöperating therewith to roll the stock into spherical shape, an intermittently moving conveyer belt and an intermittently moving, vertically adjustable, cylinder having grooves for flattening out the spherical stock bodies.

4. In confectionery machinery, the combination with a feeding device having discharge orifices, a rotary grooved feed roller, a plate having a face conforming to the surface of the roller and coöperating therewith to form a closure, an arc shaped, shaping member having grooves in its working face, and a rotary cylinder having peripheral grooves coöperating with the grooves in the shaping member.

5. In confectionery machinery, a shaping plate having two arc shaped, meeting surfaces, one of which contains raised peripheral beads, and the other of which contains peripheral depressions meeting with said beads at the junction of the two surfaces.

6. In confectionery machinery, the combination with a stationary shaping plate, of a shaping cylinder coöperating therewith, stud shafts carrying said cylinder, one of which is longitudinally movable with respect to the cylinder whereby the cylinder may be readily detached from the shafts and mechanism for rotating the cylinder.

7. In confectionery machinery, the combination with a chamber having a plurality of discharge orifices, spiral conveyers in said chamber and driving mechanism for said conveyers, of a knife extending across all of the orifices and arranged to cut off the stock material, oscillatable arms carrying said knife mechanism for operating said knife, a stationary, arc shaped shaping plate having peripheral grooves in its working face, and a rotary shaping cylinder, having peripheral grooves in its periphery coöperating with said plate.

8. In confectionery machinery, the combination with a chamber having a plurality of discharge orifices, spiral conveyers in said chamber and driving mechanism for said conveyers, of a knife for cutting off the stock material, mechanism for operating said knife, a stationary, arc shaped shaping plate having peripheral grooves in its working face, a continuously rotating shaping cylinder having peripheral grooves in its surface coöperating with said plate and an intermittently rotated, flattening cylinder operating to flatten out the stock after it has been acted on by the shaping cylinder.

9. In confectionery machinery, the combination with a chamber having a plurality of discharge orifices, spiral conveyers in said chamber and driving mechanism for said conveyers, of a knife for cutting off the stock material, mechanism for operating said knife, a stationary, arc shaped shaping plate having peripheral grooves in its working face, a continuously rotating shaping cylinder having peripheral grooves in its surface coöperating with said plate, an intermittently advanced conveyer belt, and an intermittently rotated, flattening cylinder operating to flatten out the stock after it has been acted on by the shaping cylinder.

10. In confectionery machinery, the combination with driving mechanism, of a feed casing containing a plurality of discharge orifices, mechanism in said casing for feeding stock out through said orifices, gearing between said feed mechanism and the driving mechanism, a cutting mechanism geared to the driving mechanism, a shaping plate, a shaping cylinder coöperating therewith to shape the stock, gearing between the shaping cylinder and the driving mechanism, a conveyer belt, pawl and ratchet mechanism operated by the driving mechanism for intermittently advancing the belt, and a flattening cylinder operated to move simultaneously with the belt.

11. In confectionery machinery, the combination with driving mechanism, of a feed casing containing a plurality of discharge orifices, mechanism in said casing for feeding stock out through said orifices, gearing between said feed mechanism and the driving mechanism, a cutting mechanism geared to the driving mechanism, a shaping plate, a shaping cylinder coöperating therewith to shape the stock, gearing between the shaping cylinder and the driving mechanism, a conveyer belt, pawl and ratchet mechanism operated by the driving mechanism for intermittently advancing the belt, a flattening cylinder and gearing between the cylinder and belt for causing them to move in unison.

12. In confectionery machinery, the combination with feeding mechanism having a plurality of discharge orifices, a suitably operated knife for cutting off the stock into blocks, a shaping plate and a shaping cylinder coöperating therewith, of a supply pipe for a lubricant, faucets arranged to direct the lubricant upon the knife and cylinder, and a regulating device for opening and closing all of the faucets.

13. In confectionery machinery, the combination with feeding mechanism having a plurality of discharge orifices, a suitably operated knife for cutting off the stock into blocks, a grooved shaping plate and a rotary grooved, shaping cylinder coöperating therewith, of a water supply pipe, a series of faucets extending out from said pipe in alinement with the grooves in the cylinder, a series of faucets extending out from said pipe in alinement with the knife, and a rod connected to the handles of said faucets for opening and closing the faucets.

In witness whereof I have hereunto subscribed my name at Chicago, Illinois, this 9th day of January A. D. 1909.

SPEERO POOLEY.

Witnesses:
CHARLES O. SHERVEY,
FANNIE F. RICHARDS.